(Model.)
J. GNADINGER, Jr.
TRY BOX AND INDICATOR FOR SPIRIT CISTERNS.
No. 270,416. Patented Jan. 9, 1883.
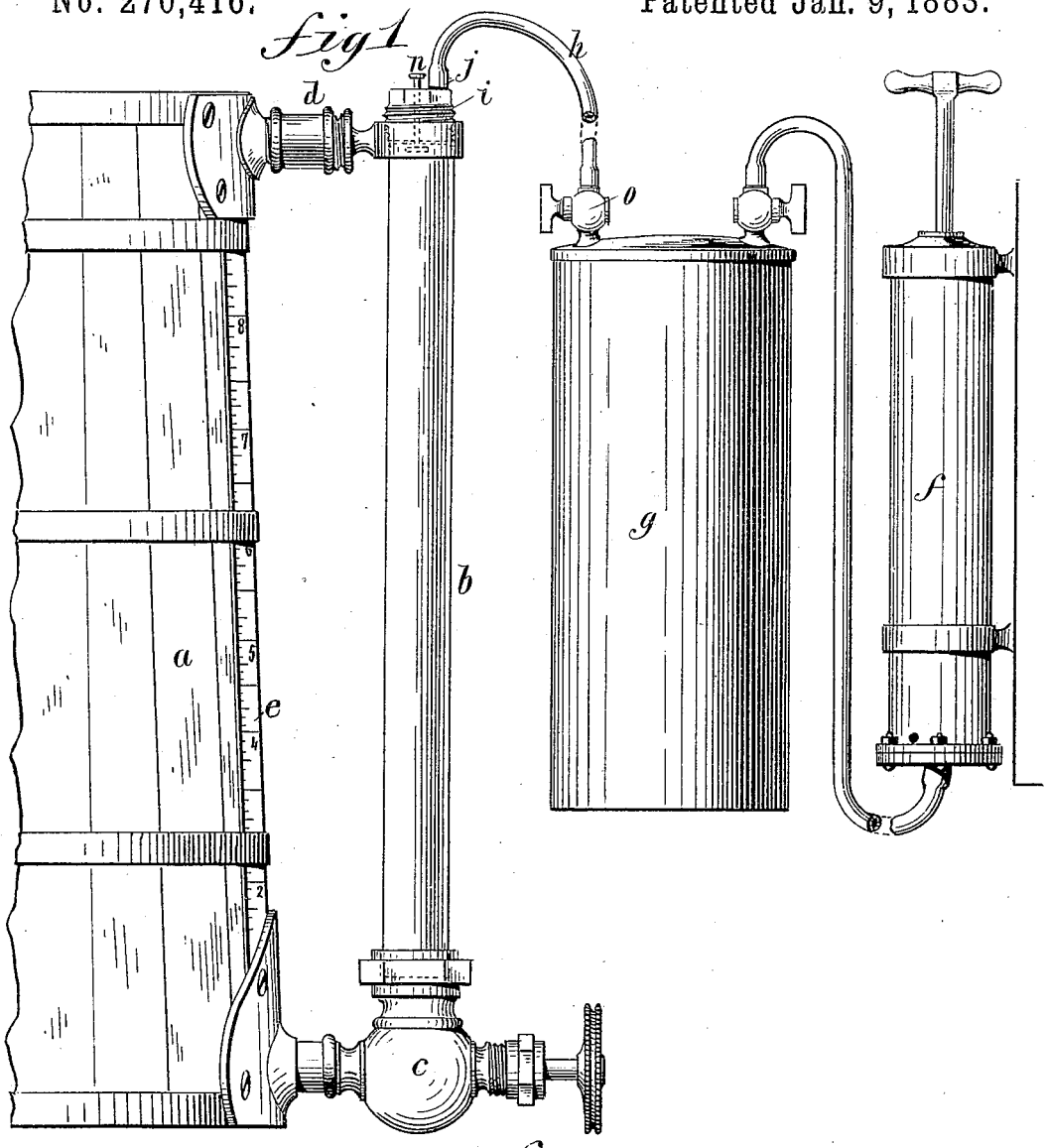
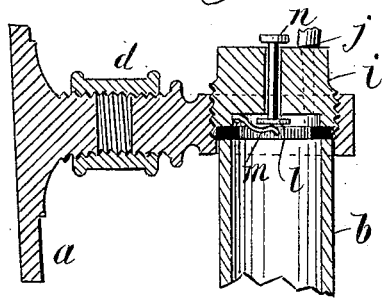
WITNESSES:
J. D. Garfield
C. Sedgwick
INVENTOR:
J. Gnadinger Jr.
BY Munn & Co.
ATTORNEYS.

UNITED STATES PATENT OFFICE.

JOHN GNADINGER, JR., OF PARIS, KENTUCKY.

TRY-BOX AND INDICATOR FOR SPIRIT-CISTERNS.

SPECIFICATION forming part of Letters Patent No. 270,416, dated January 9, 1883.

Application filed October 17, 1882. (Model.)

*To all whom it may concern:*

Be it known that I, JOHN GNADINGER, Jr., of Paris, in the county of Bourbon and State of Kentucky, have invented a new and Improved Try-Box and Indicator for Spirit-Cisterns, of which the following is a full, clear, and exact description.

This invention is an improvement of the improved try-box and indicator for spirit-cisterns described and claimed in a patent heretofore granted to me, the said improvement being a compressed-air attachment to the said try-box and indicator to be used for expelling the liquor from the glass tube of the try-box and allowing it to fill again as often as desired with fresh samples for obtaining numerous and thereby more reliable tests than can be obtained from one sample; and the attachment is also designed, to be employed for forcing air into the liquor contained in the cistern for agitating and purifying it.

Reference is to be had to the accompanying drawings, forming part of this specification, in which similar letters of reference indicate corresponding parts in all the figures.

Figure 1 is a side elevation of my aforesaid improved try-box and indicator with the compressed-air attachment which I now propose; and Fig. 2 is a detail section of the top of the try-box and indicator, showing the manner of connecting the attachment.

$a$ represents the cistern containing the spirits to be tried and indicated; $b$, the glass tube of the try-box and indicator; $c$, the globe-valve connection for admitting the liquor into the tube; $d$, the top connection for supporting the upper end of the glass tube and adjusting it for perpendicular position, all being substantially described and represented in my aforesaid patent, the glass tube having removable top or cover to allow the instruments to be inserted in the liquor contained in the glass for testing the quality and temperature. The scale $e$ on the side of the cistern indicates the height of the liquor in the tube $b$, and thereby shows the quantity contained in the cistern.

For the purpose of forcing the liquor back out of the glass tube into the cistern after being tried to admit a fresh sample, I now propose to connect an air-compressing pump, $f$, or an intervening compressed-air receiver, $g$, with the glass tube to force in the air either directly from the pump or from the receiver when required, the connection being preferably by a flexible tube, $h$, attached to a removable plug, $i$, screwing into the top of the tube, and having a nipple, $j$, over which the end of the tube is stretched; and for the purpose of allowing the air to escape from the glass tube when it is desired to allow a new sample of liquor to flow in, the plug is provided with a valve, $l$, which is held up to its seat by a spring, $m$, and has a stem, $n$, extending up through the top of the plug, for pressing the valve down by the finger, the cock $o$ in the air-supply pipe $h$ being shut. It will be seen that with this attachment the usefulness of the try-box and indicator is considerably increased.

Having thus described my invention, what I claim as new, and desire to secure by Letters Patent, is—

1. The combination, with glass tube $b$ of a try-box and indicator for a liquor-cistern, of a compressed-air attachment, substantially as described, for injecting air to change the samples and agitate the liquor in the cistern, substantially as specified.

2. The combination, with the glass tube $b$ of a try-box and indicator for a liquor-cistern, of a compressed-air attachment, substantially as described, and a valve, $l$, for the escape of the air when required, substantially as specified.

3. The combination of the removable plugs $i$, having the valve $l$, and compressed-air pipe $h$, with the glass tube $b$, of an indicator and try-box for liquor-cisterns, substantially as described.

JOHN GNADINGER, JR.

Witnesses:
JNO. C. BRENT,
ELLIOTT KELLY.